(12) United States Patent
Vance et al.

(10) Patent No.: US 8,750,290 B2
(45) Date of Patent: Jun. 10, 2014

(54) METHOD AND APPARATUS FOR ENSURING ACCESSIBILITY TO EMERGENCY SERVICE VIA VOIP OR VIA PSTN

(75) Inventors: William H. Vance, Somerville, MA (US); Frank B. Manning, Boston, MA (US)

(73) Assignee: ZOOM Telephonics, Inc., Boston, MA (US)

( * ) Notice: Subject to any disclaimer, the term of this patent is extended or adjusted under 35 U.S.C. 154(b) by 1748 days.

(21) Appl. No.: 11/582,870

(22) Filed: Oct. 18, 2006

(65) Prior Publication Data

US 2007/0121593 A1    May 31, 2007

Related U.S. Application Data

(63) Continuation-in-part of application No. 11/450,137, filed on Jun. 9, 2006, now abandoned.

(60) Provisional application No. 60/693,745, filed on Jun. 23, 2005, provisional application No. 60/689,266, filed on Jun. 10, 2005.

(51) Int. Cl.
*H04L 12/66* (2006.01)
*H04M 11/04* (2006.01)

(52) U.S. Cl.
CPC .............. *H04L 12/66* (2013.01); *H04M 11/04* (2013.01)
USPC ......................................................... 370/352

(58) Field of Classification Search
CPC ..................................................... H04L 12/66
USPC .................. 370/259, 261, 266, 329, 352, 401
See application file for complete search history.

(56) References Cited

U.S. PATENT DOCUMENTS

| RE35,582 | E  | * | 8/1997  | Pariani et al. ............ 379/399.02 |
| 6,075,849 | A  | * | 6/2000  | Lee et al. ...................... 379/140 |
| 6,363,065 | B1 |   | 3/2002  | Thornton et al. |
| 6,665,293 | B2 |   | 12/2003 | Thornton et al. |
| 6,944,151 | B1 |   | 9/2005  | Menard |
| 7,027,564 | B2 | * | 4/2006  | James ............................ 379/37 |

(Continued)

OTHER PUBLICATIONS

"Zoom ATA Deployment Guide for Service Providers," *Zoom ATA Deployment Guide, Version 1.2*, pp. 1-16 (Jan. 2006).

(Continued)

*Primary Examiner* — Man Phan
*Assistant Examiner* — Nourali Mansoury
(74) *Attorney, Agent, or Firm* — Hamilton, Brook, Smith & Reynolds, P.C.

(57) ABSTRACT

The Federal Communications Commission Order 05-116, E911 Requirements for IP-Enabled Service Providers, (FCC Order) requires interconnected Voice over Internet Protocol (VoIP) service providers to deliver all emergency service calls to a VoIP service user's local emergency service operator as a standard feature of the service. Under the FCC Order, VoIP service providers must supply emergency service if the VoIP service user accesses the VoIP service over broadband and if the VoIP service provider interconnects to and from the Public Switched Telephone Network (PSTN). Embodiments of the present invention guarantee compliance with the FCC Order by routing a call as either a VoIP call over the Internet or as a conventional call over the PSTN, verifying that at least one of the VoIP or PSTN telephony connections supports emergency service and routing calls over that connection or, if there is no connection supplying emergency service, restricting calling over the VoIP connection.

38 Claims, 11 Drawing Sheets

(56) References Cited

U.S. PATENT DOCUMENTS

| | | |
|---|---|---|
| 7,103,151 B2 | 9/2006 | Lass et al. |
| 7,123,606 B2 | 10/2006 | Wu et al. |
| 7,215,638 B1 * | 5/2007 | Roberts et al. ............... 370/231 |
| 7,483,416 B2 * | 1/2009 | Olivier et al. ................ 370/352 |
| 7,548,537 B2 * | 6/2009 | Pfleging et al. .............. 370/352 |
| 7,573,988 B2 * | 8/2009 | Lee et al. ................... 379/88.17 |
| 8,265,587 B2 * | 9/2012 | D'Evelyn et al. ........... 455/404.1 |
| 2003/0109245 A1 * | 6/2003 | McCalmont et al. ......... 455/404 |
| 2004/0184584 A1 * | 9/2004 | McCalmont et al. ........... 379/45 |
| 2006/0221938 A1 | 10/2006 | Lin et al. |

OTHER PUBLICATIONS

"X5v and V3 Technical Reference" Zoom® pp. 1-54, (2005).

* cited by examiner

| 911service-profile ||
|---|---|
| Field | Values |
| SIPProvider-Supports911 | YES |
| | NO |
| UserAccountEnabledFor-911 | YES |
| | NO |
| Allow-VoIPToVoIPCalls | YES |
| | NO |
| 911-ServiceNotRequired | YES |
| | NO |

FIG. 3

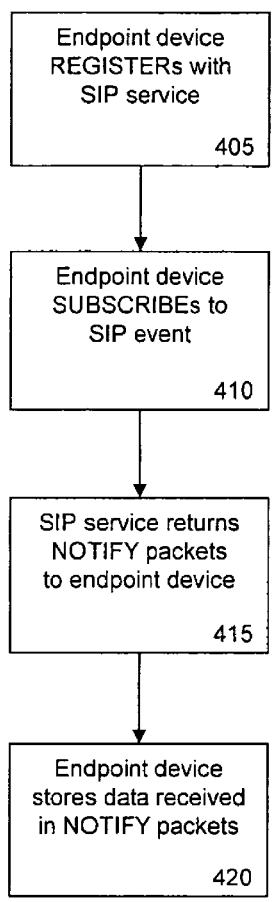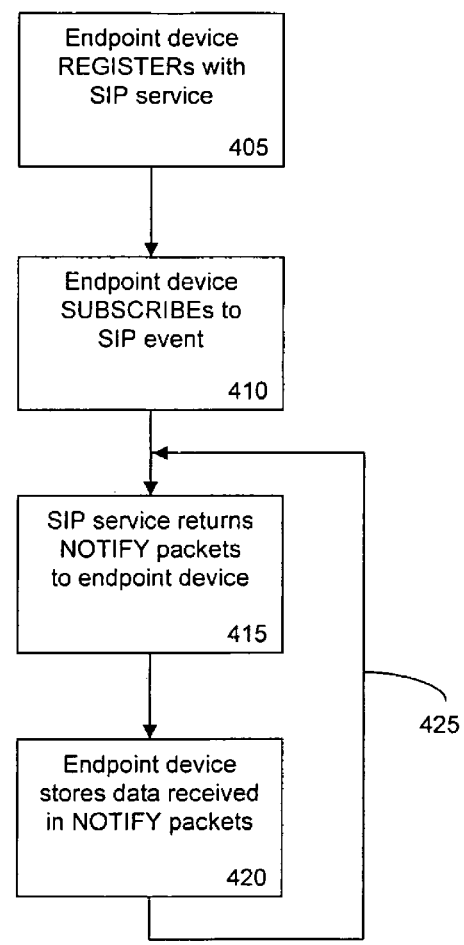
FIG. 4A
FIG. 4B

| States of 911 Availability |||
|---|---|---|
| State | VoIP 911 | PSTN 911 |
| A | NO | NO |
| B | YES | NO |
| C | NO | YES |
| D | YES | YES |

FIG. 7

| States of 911 Availability in VoIP Only Mode ||
|---|---|
| State | VoIP 911 |
| A | NO |
| B | YES |

FIG. 8

METHOD AND APPARATUS FOR ENSURING ACCESSIBILITY TO EMERGENCY SERVICE VIA VOIP OR VIA PSTN

RELATED APPLICATIONS

This application is a continuation-in-part of U.S. application Ser. No. 11/450,137, filed on Jun. 9, 2006 now abandoned, which claims the benefit of U.S. Provisional Application No. 60/693,745, filed on Jun. 23, 2005 and U.S. Provisional Application No. 60/689,266, filed on Jun. 10, 2005. The entire teachings of the above applications are incorporated herein by reference.

BACKGROUND OF THE INVENTION

The Federal Communications Commission (FCC) Order 05-116, E911 Requirements for IP-Enabled Service Providers, hereinafter referred to as the FCC Order, stipulates that interconnected Voice over Internet Protocol (VoIP) service providers must deliver 911 calls to a VoIP service user's local emergency service operator as a standard feature of the service. The term "interconnected" refers to the ability of the VoIP service provider to enable VoIP service users to receive calls from and terminate calls to the public switched telephone network (PSTN).

Under the FCC Order, VoIP service providers must supply 911 service if the VoIP service user accesses the VoIP service over broadband and if the VoIP service provider supplies interconnection both to and from the PSTN. Interconnected VoIP service providers must provide emergency service operators with the call back number and location information of the VoIP service users (i.e., E911) where the emergency service operator is capable of receiving it. If the VoIP service provider's approach requires some or all VoIP service users to provide location information, the VoIP requires some or all VoIP service users to provide location information, the VoIP service provider must supply the VoIP service user a means of providing and updating this information.

Interconnected VoIP service providers must also inform the VoIP service users, both new and existing, of the E911 capabilities and limitations of the VoIP service. To aid the VoIP service providers in implementing methods to conform to the FCC Order, the incumbent local exchange carriers are required to provide access to their E911 networks to any requesting telecommunications carrier, and must continue to provide access to trunks, selective routers, and E911 databases to competing carriers.

SUMMARY OF THE INVENTION

A VoIP service provider knows whether it operates under the conditions which would require it to supply emergency service to the VoIP service users (i.e., customer access over broadband and interconnectivity). However, it may be difficult for a VoIP service provider subject to the FCC Order to ensure that its VoIP service users are supplied with emergency service at all times. If a VoIP service provider is required to supply emergency service to its VoIP customers, then the VoIP service provider wants to be able to control its VoIP service users' ability to place calls using the VoIP service depending on whether emergency service is available to the VoIP service user.

A VoIP service user might be supplied with emergency service by a means other than that by the VoIP service provider, such as over the PSTN. If the VoIP service provider knows that a VoIP service user has an active PSTN connection in addition to the VoIP service, and the VoIP service provider knows that the VoIP service user has a telephone endpoint device that automatically routes emergency service calls over that PSTN line, the VoIP service provider can operate under the assumption that the VoIP service user will have emergency service as long as the PSTN connection remains active, because emergency service is mandatory on active PSTN lines within the United States. Thus, the determination of an active PSTN line drastically simplifies complying with the FCC Order. However, if the VoIP service provider knows that the FCC Order is inapplicable or the requirements of the FCC Order are satisfied (i.e., the VoIP service provider is not interconnected to the PSTN or the VoIP service provider supplies emergency service operators with the call back number and location information of the VoIP service users), the status of a customer's PSTN line, if present, is irrelevant.

In an example embodiment of the present invention, an endpoint telephone device has a packet network interface, a telephone line interface, a telephone set interface and a controller. The packet network interface is to be connected to a packet network. The telephone line interface is to be connected to a telephone line. The telephone set interface is to be connected to a telephone set. One skilled in the art will understand that the telephone set could be, but is not limited to, a cordless telephone or a corded telephone.

The controller is configured to monitor a set of bits transmitted from the VoIP service provider that indicate whether a VoIP service provider is required to supply emergency service to the endpoint telephone device, sense access to emergency service on the packet network interface and the telephone line interface, and route or restrict calls depending on the sensed access. The emergency service may be 911 service.

The controller may disable all calling via the VoIP service over the packet network when the VoIP service provider is required to supply emergency service to the endpoint telephone device and the controller senses that emergency service is not available via the VoIP service over the packet network or via the PSTN over the telephone line.

The controller may route all calls, including emergency service calls, via the VoIP service over the packet network when the VoIP service provider is required to supply emergency service to the endpoint telephone device and the controller senses that emergency service is available via the VoIP service over the packet network and is not available via the PSTN over the telephone line.

The controller may route emergency service calls via the PSTN over the telephone line when the VoIP service provider is required to supply emergency service to the endpoint telephone device and the controller senses that emergency service is not available via the VoIP service over the packet network and is available via the PSTN over the telephone line.

The controller may route all calls, including emergency service calls, via the VoIP service over the packet network or via the PSTN over the telephone line according to information supplied to the controller when the VoIP service provider is required to supply emergency service to the endpoint telephone device and the controller senses that emergency service is available via the VoIP service over the packet network and via the PSTN over the telephone line.

The controller may route all calls via the VoIP service over the packet network or via the PSTN over the telephone line according to information supplied to the controller when the VoIP service provider is not required to supply emergency service to the endpoint telephone device.

The controller may also route VoIP calls, but only to other VoIP devices, if the VoIP service provider is not required to supply emergency service to the endpoint telephone device and the controller senses that emergency service is not available via the VoIP service over the packet network or via the PSTN over the telephone line.

More generally, we can think of the endpoint device as having some programmable bits that can be set by the VoIP service provider and used to determine the endpoint's behavior, including its decision about whether to route a call to a VoIP service provider. Further, the routing decision need not be made at the endpoint device, but may alternatively be made at the VoIP service provider's server, as long as the endpoint supplies the server with required information in relation to the status of the endpoint's PSTN connection.

The endpoint telephone device may contain a software switch to connect the telephone set interface to the telephone line interface or, alternatively, to the packet network interface. In another example embodiment, the switch may be a hardware switch or relay. In an example embodiment, the hardware relay automatically connects the telephone set interface to the telephone line interface when power is disrupted to the endpoint telephone device. The endpoint telephone device may also contain a switch that allows a user to specify whether the telephone line interface will be connected via a telephone line to the PSTN.

In operation of an example embodiment, a VoIP service user configures his or her account with the VoIP service provider to indicate information, such as the VoIP service user's street address. The VoIP service user then registers the endpoint telephone device with the VoIP service provider such that the endpoint telephone device is associated with the VoIP service user. The endpoint telephone device then notifies the VoIP service provider whether emergency service is available to the VoIP service user via the telephone line interface. In response, the VoIP service provider typically notifies the endpoint telephone device whether the VoIP service provider is required by the FCC Order to supply emergency service to the VoIP service user, whether the VoIP service user's account is configured for VoIP emergency service, and whether the VoIP service provider supplies emergency service to the VoIP service user. The endpoint telephone device then activates VoIP calling if emergency service is available via the PSTN. Otherwise, if the VoIP service provider is required by the FCC Order to supply emergency service, the VoIP service user's account is configured for VoIP emergency service, and the VoIP service provider provides emergency service to the VoIP service user, then the endpoint telephone device may also activate VoIP calling.

The endpoint telephone device may also notify the VoIP service provider whenever it detects a change in whether an active PSTN line is present. The endpoint telephone device may determine the status of emergency service via the PSTN line by determining whether the PSTN line is active. The determination of an active PSTN connection is taken to imply the availability of emergency service on the PSTN line because such emergency service is mandatory on active PSTN lines within the United States.

In addition to notifying the VoIP service provider when a change in status has occurred of a connection to a PSTN line, the endpoint telephone device may transmit status information on a periodic basis. Whenever the endpoint telephone device transmits such status information, whether because of a change in state or on a periodic basis, the endpoint telephone device expects a response from the VoIP service provider that indicates the current status of the VoIP service provider. The endpoint telephone device may disable VoIP calling if a number of successive such notifications from the VoIP service provider fail to arrive at the endpoint telephone device when expected, unless the PSTN connection is active.

The VoIP service provider may periodically notify the endpoint telephone device whether the VoIP service provider is required to supply emergency service, whether the VoIP service user's account is configured for VoIP emergency service, and whether the VoIP service provider supplies emergency service. Additionally, the VoIP service provider may immediately notify the endpoint telephone device whenever there is a change in the status any of these factors.

The endpoint telephone device may disable VoIP calling if emergency service is required by the FCC Order but is unavailable via either the PSTN line or VoIP service provider. The endpoint telephone device may then notify the VoIP service provider that VoIP calling has been disabled.

Note that, alternatively, the VoIP service provider may make routing decisions based on its own knowledge of requirements of emergency service call handling, together with the service's capabilities for handling emergency service calls from the particular subscriber, and information forwarded to the VoIP service provider from the endpoint, relative to the availability of a PSTN connection at the endpoint.

BRIEF DESCRIPTION OF THE DRAWINGS

FIG. 3 is a table illustrating four data fields used by a VoIP service provider to control a VoIP service user's endpoint telephone device.

FIGS. 4A-4B are flow diagrams illustrating the mechanism used to communicate with the endpoint telephone device.

FIG. 7 is a table illustrating four states of PSTN and VoIP emergency service availability.

FIG. 8 is a table illustrating two states of VoIP emergency service availability when the endpoint telephone device is in VoIP only mode.

DETAILED DESCRIPTION OF THE INVENTION

A description of preferred embodiments of the invention follows.

Device Hardware

Figure 1A:
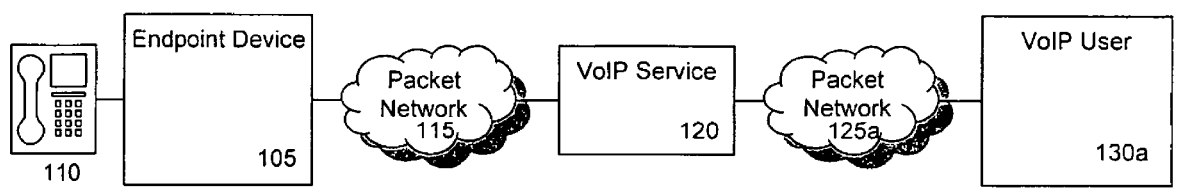
FIGS. 1A-1C are network diagrams illustrating different connections that may be implemented using an endpoint telephone device embodying the invention.
Figure 1B:
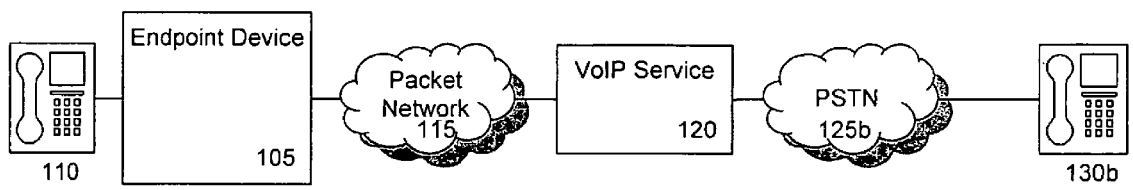
Figure 1C:
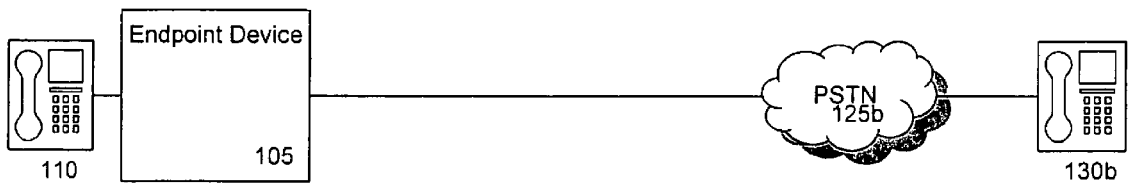

FIGS. 1A-1C are network diagrams illustrating different connections that may be implemented using an endpoint telephone device embodying the invention. FIG. 1A is a network diagram 100a illustrating the connection of an endpoint telephone device 105 to a telephone set 110 for making a telephone call over a packet network 115 via VoIP service 120 over a packet network 125a to a VoIP service user 130a. FIG. 1B is a network diagram 100b illustrating the connection of an endpoint telephone device 105 to a telephone set 110 for making a telephone call over a packet network 115 via VoIP service 120 over PSTN 125b to a telephone set 130b. FIG. 1C is a network diagram 100c illustrating the connection of an endpoint telephone device 105 to a telephone set 110 for making a telephone call over PSTN 125b to a telephone set 130b.

Figure 2A:
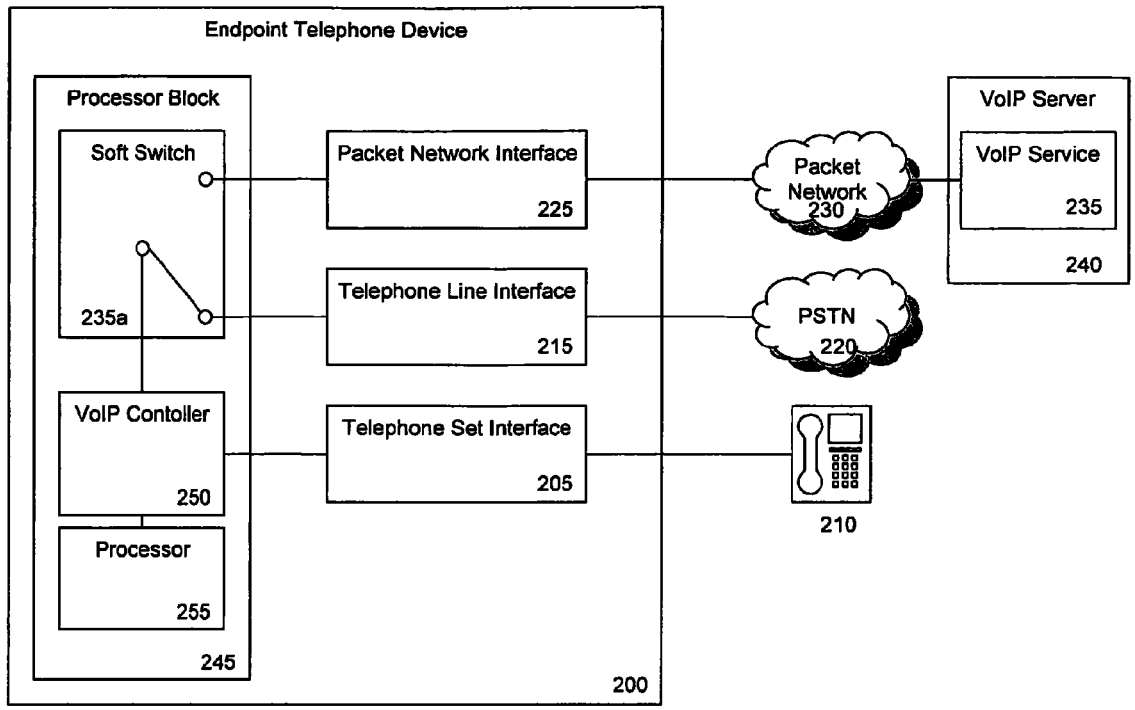
FIGS. 2A-2E are block diagrams illustrating example embodiments of an endpoint telephone device.
Figure 2B:
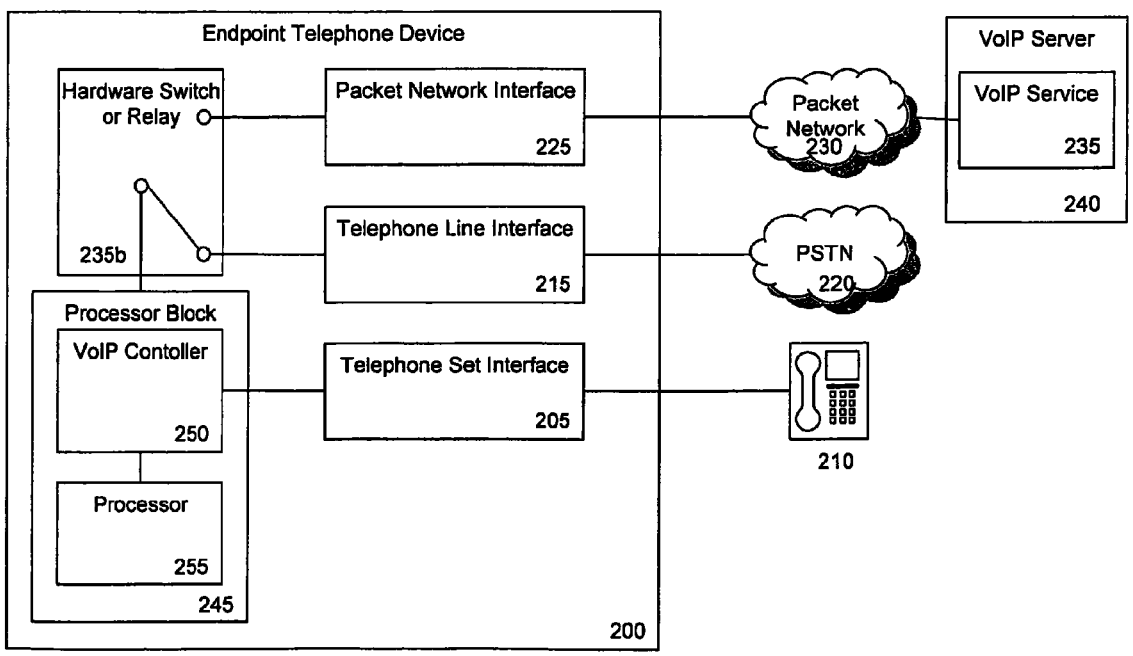
Figure 2C:
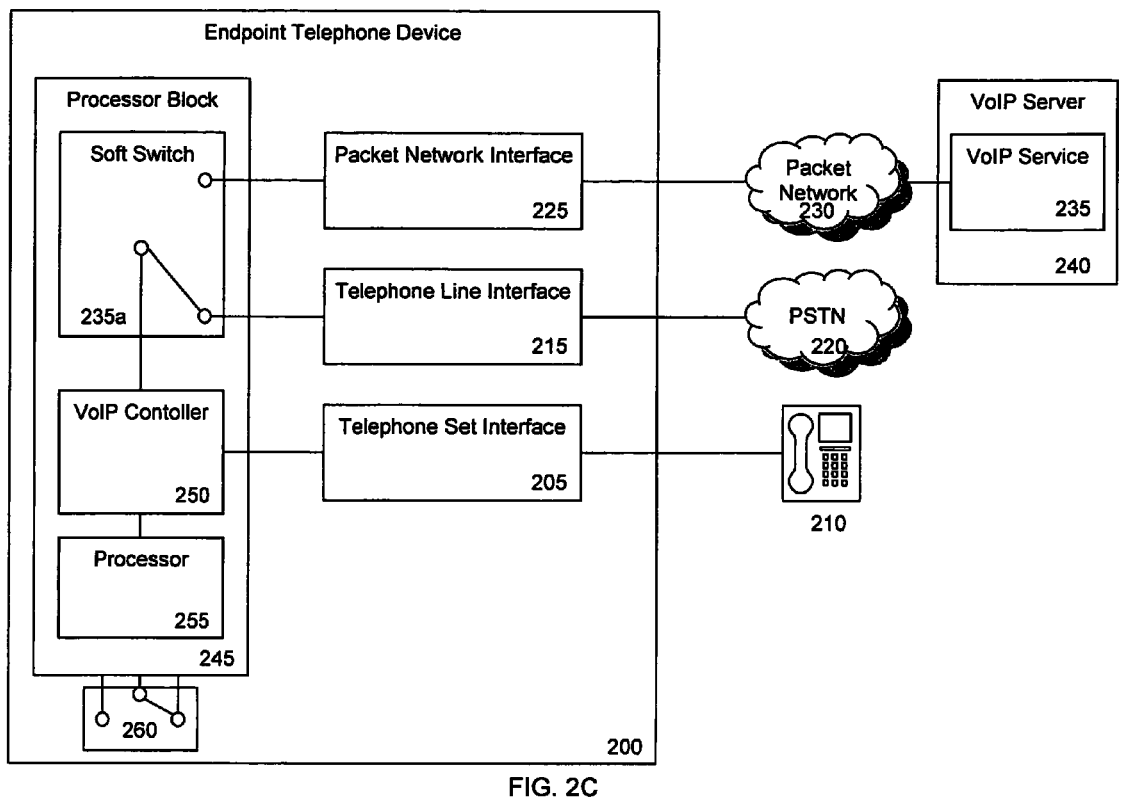
Figure 2D:
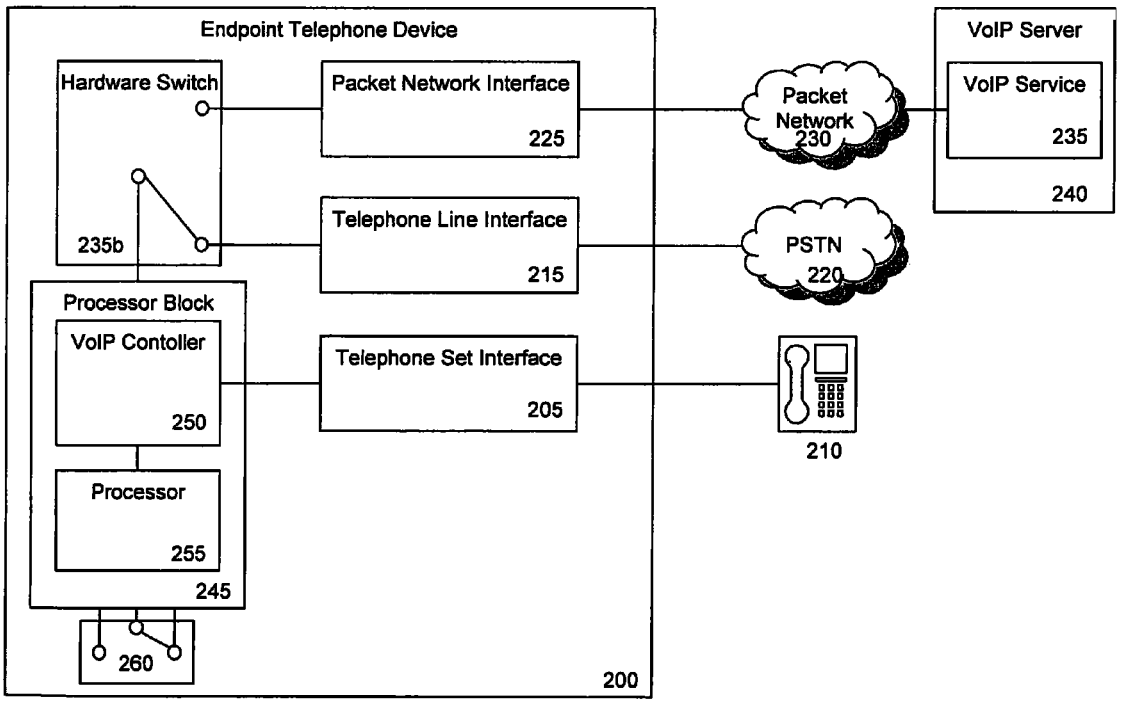

FIGS. 2A-2E are block diagrams illustrating example embodiments of an endpoint telephone device 200. In FIGS. 2A-2D, the endpoint telephone device 200 includes a telephone set interface 205 for connecting to a telephone set 210, a telephone line interface 215 for connecting to a telephone line 220, and a packet network interface 225 for connecting to a packet network 230, such as the Internet. In FIGS. 2A and 2C, the endpoint telephone device 200 uses a software switch 235a to connect the telephone set interface 205 to the telephone line interface 215 or, alternatively, to the packet network interface 225. In an alternate example embodiment, as illustrated by FIGS. 2B and 2D, the endpoint telephone device can use a hardware switch or relay 235b to connect the telephone set interface 205 to the telephone line interface 215 or, alternatively, to the packet network interface 225.

Figure 2E:
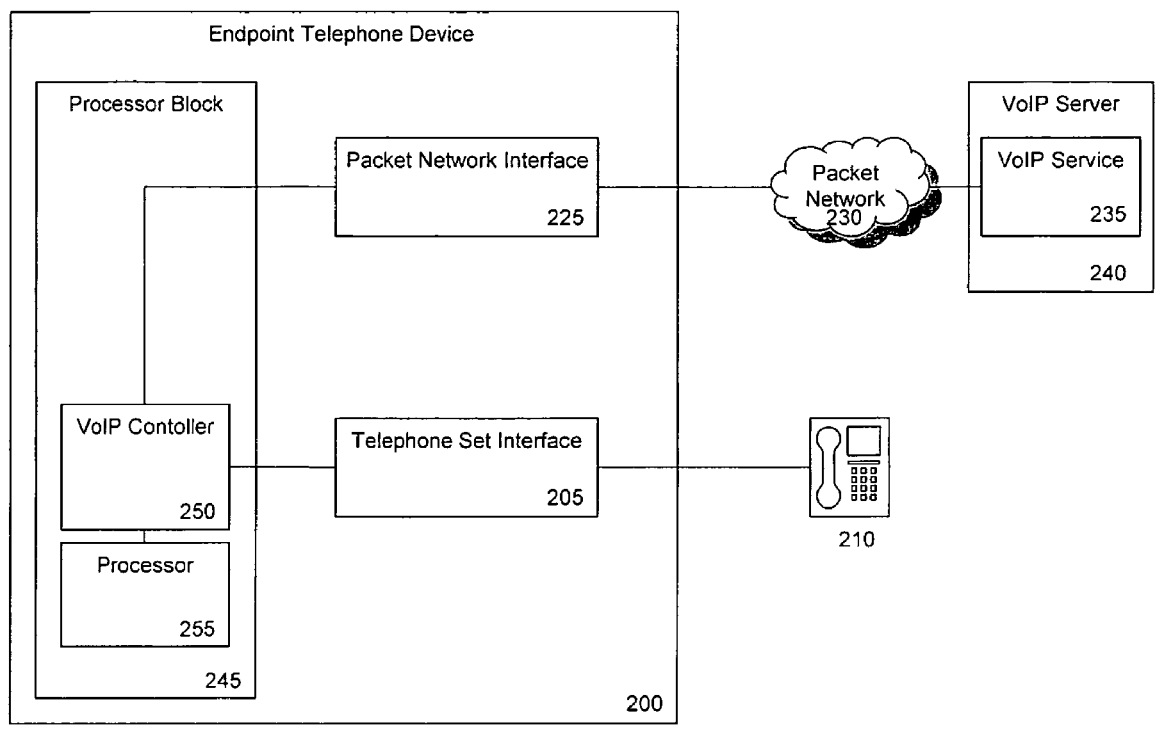

In the embodiment as illustrated by FIG. 2E the endpoint telephone device 200 includes a telephone set interface 205 for connecting to a telephone set 210 and a packet network interface 225 for connecting to a packet network 230, such as the Internet. Because this embodiment does not provide a telephone line interface 215 for connecting to a telephone line 220, the soft switch 235a or a hardware switch or relay 235b to connect the telephone set interface 205 to the packet network interface 225 or, alternatively, to the telephone line interface 215 are not required.

In the example embodiments illustrated by FIGS. 2A-2D, the endpoint telephone device 200 communicates over a PSTN network 220 or over a packet network 230 with a VoIP service 235 stored on a VoIP server 240. The VoIP service 235 facilitates initiating telephone calls from the telephone set 210 to be transmitted over the packet network 230. The processor block 245 includes a VoIP controller 250 and a processor 255, and is connected to the telephone set interface 205, telephone line interface 215 and packet network interface 225. In FIG. 2E, the processor block 245 is connected to the telephone set interface 205 and the packet network interface 225.

In an example embodiment, the processor 255 senses the availability of emergency service on both the PSTN and the VoIP network and runs a Session Initiation Protocol (SIP) stack that controls the VoIP telephony feature. In an alternate example embodiment, as illustrated by FIGS. 2C and 2D, the endpoint telephone device can contain a switch 260 to control whether or not the processor 255 checks for an active PSTN connection at the telephone line interface 215 and allows only VoIP calls to be made over the packet network 230. For example, if a VoIP service user knows that there is no PSTN line connected to the telephone line interface of the endpoint telephone device, such as when the VoIP service user does not have an active PSTN line with a PSTN carrier, the VoIP service user can indicate, via this switch, that the endpoint telephone device should place calls over only the packet network and not check for PSTN connectivity. Additionally, in another example embodiment, as illustrated by FIG. 2E, because the endpoint telephone device does not contain a telephone line interface, the endpoint telephone device may only make calls over the packet network 230.

In one embodiment, the packet network interface 225 is a WAN Ethernet port that can be connected to a broadband Internet access device such as a Digital Subscriber Line (DSL) modem or cable modem. In alternate embodiments, the packet network interface 130 can be an integrated DSL modem, integrated cable modem or other access medium, such as wireless or power line networking. In an alternate example embodiment, the packet network interface 225 may be an Asymmetric Digital Subscriber Line (ADSL) enabled telephone line, in which case the telephone line interface 215 and the packet network interface 225 may share the same physical interface, although they are logically distinct.

In one embodiment, the telephone line interface 215 is a DSL port with PSTN service enabled. In alternate embodiments, this can be an FXO port, or a variant that allows a telephone connected to the device to be switched, as by a relay, directly to the PSTN.

Device Operation—Eservice-Profile

In a process that is separate and distinct from the endpoint telephone device setup, the VoIP service provider configures a VoIP service user's account for VoIP emergency service. To do this, the VoIP service provider determines the physical location of the endpoint telephone device either by some automated means or by requiring that the VoIP service user provide and authenticate the location information.

The endpoint telephone device determines the status of emergency service through the VoIP connection or, more specifically, whether the VoIP service provider is required by the FCC Order to supply emergency service and whether the VoIP service provider supplies that service, by making use of the SIP mechanism called SUBSCRIBE/NOTIFY, as described in Internet Engineering Task Force (IETF) Request for Comments (RFC) 3265. The SUBSCRIBE/NOTIFY mechanism provides a means for a SIP service to convey specific information to the endpoint telephone device.

FIG. 3 is a table 300 illustrating four data fields in the SIP event Eservice-profile and the two values each field can have. Data field SIPProvider-Supports911 indicates whether the VoIP service provider supplies emergency service for VoIP service users and can take the value YES or NO. Data field UserAccountEnabledFor-911 indicates whether the VoIP service user's account is configured with certain data, including the physical location of the endpoint telephone device, and can take the value YES or NO. Data field Allow-VoIPToVoIP-Calls indicates whether the VoIP service provider allows the VoIP service users, under certain circumstances, to make direct calls to other VoIP customers only, and can take the value YES or NO. Data field 911-ServiceNotRequired indicates whether the VoIP service user is among those not required under the FCC Order to be supplied emergency service by the VoIP service provider, and can take the value YES or NO.

FIG. 4A is a flow diagram 400a illustrating the use of the SIP mechanism SUBSCRIBE/NOTIFY to convey specific information regarding emergency service supplied by the VoIP service provider to the endpoint telephone device. First, the endpoint telephone device REGISTERs 405 with the SIP service of the VoIP service provider using account information provisioned in the endpoint telephone device. This information is distinct from the emergency service location information, and the method for loading this information is beyond the scope of this description. Next the endpoint telephone device SUBSCRIBES 410 to the SIP event Eservice-profile. The SIP service returns a NOTIFY 415 packet for this event that tells the endpoint telephone device whether or not it can and should make emergency service calls through the VoIP service. The NOTIFY packet does this by indicating the values of the data fields in Eservice-profile as illustrated in FIG. 3. In general, the SIP service will send NOTIFY packets related to an event any time there is a change in the status described by the event. In the case of Eservice-profile, the SIP service will send NOTIFY packets as soon as the subscription is initiated to convey the initial status. The endpoint telephone device then stores 420 that data. In another example embodiment, as illustrated by FIG. 4B, the SIP service may also repeat 425 sending NOTIFY packets 415 to the endpoint telephone device that indicate whether the service continues to support VoIP emergency service and whether the particular VoIP service user account is activated for VoIP emergency service. The endpoint telephone device stores 420 the status indication it receives via the Eservice-profile notification 415.

Device Operation—Checking for Emergency Service

Figure 5A:
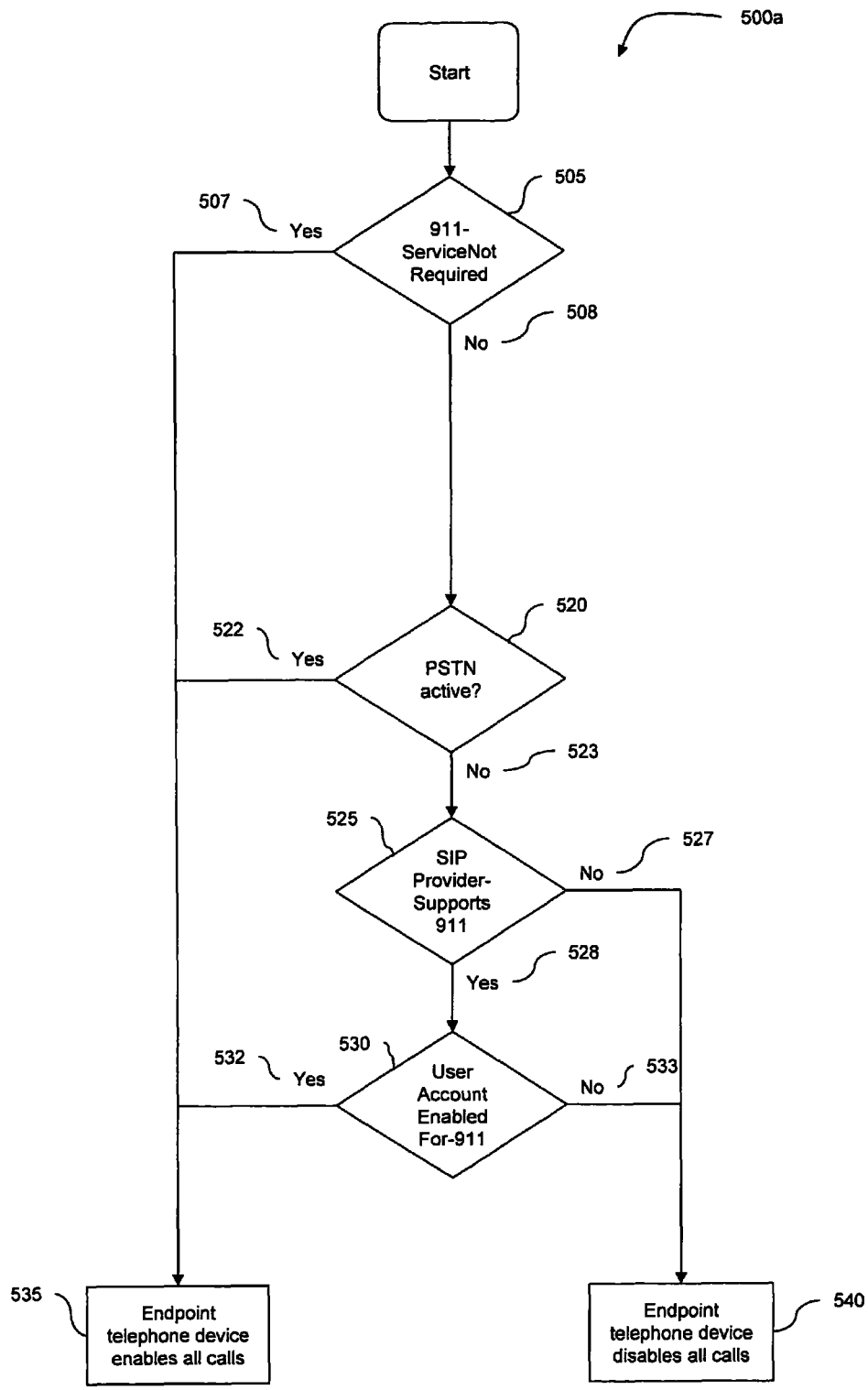
FIGS. 5A-5C are flow diagrams illustrating the algorithm performed in determining whether the VoIP service provider complies with the FCC Order and allowing calling based on that compliance.

FIG. 5A is a flow diagram illustrating an example embodiment of the algorithm performed in determining whether the VoIP service provider complies with the FCC Order and allowing calling based on that compliance. First, the endpoint telephone device checks the value of data field 911-ServiceNotRequired 505 in Eservice-profile to determine whether emergency service is required under the FCC Order. If the value of data field 911-ServiceNotRequired 505 is YES 507, indicating that emergency service is not required by the FCC Order (implying that the VoIP service provider is not interconnected with the PSTN), then the endpoint telephone device enables all calls 535.

If the value of data field 911-ServiceNotRequired is NO 508, indicating that emergency service is required under the FCC Order (implying that the VoIP service provider is interconnected with the PSTN), then the endpoint telephone device must determine whether emergency service is provided over the PSTN connection. The endpoint telephone device checks whether the PSTN connection is active 520. The determination of an active PSTN connection implies the availability of emergency service on the PSTN line because emergency service is mandatory on active PSTN lines within the United States. If the PSTN connection is active 522, the FCC Order is satisfied because emergency service is available via the PSTN. The endpoint telephone device enables all calls 535.

However, if the PSTN connection is not active 523, the FCC Order is not yet satisfied and the endpoint telephone device must determine whether the VoIP service provider supplies emergency service. The endpoint telephone device checks the value of data field SIPProvider-Supports911 525 in Eservice-profile. If the value of data field SIPProvider-Supports911 525 is NO 527, indicating that the VoIP service provider does not support emergency service, then there is no emergency service via either the PSTN or the VoIP service provider to satisfy the FCC Order. The endpoint telephone device disables all calls 540.

If the value of data field SIPProvider-Supports911 525 is YES 528, indicating that the VoIP service provider does support emergency service, then the endpoint telephone device must determine whether the VoIP service user's account is configured for VoIP emergency service. The endpoint telephone device checks the value of the data field UserAccountEnabledFor-911 530 in Eservice-profile. If the value of data field UserAccountEnabledFor-911 530 is YES 532, indicating that the VoIP service user's account is enabled for VoIP emergency service, then the endpoint telephone device enables all calls 535. Otherwise, if the value of data field UserAccountEnabledFor-911 530 is No 533, indicating that the VoIP service user's account is not enabled for VoIP emergency service, then the endpoint telephone device disables all calls 540.

Figure 5B:
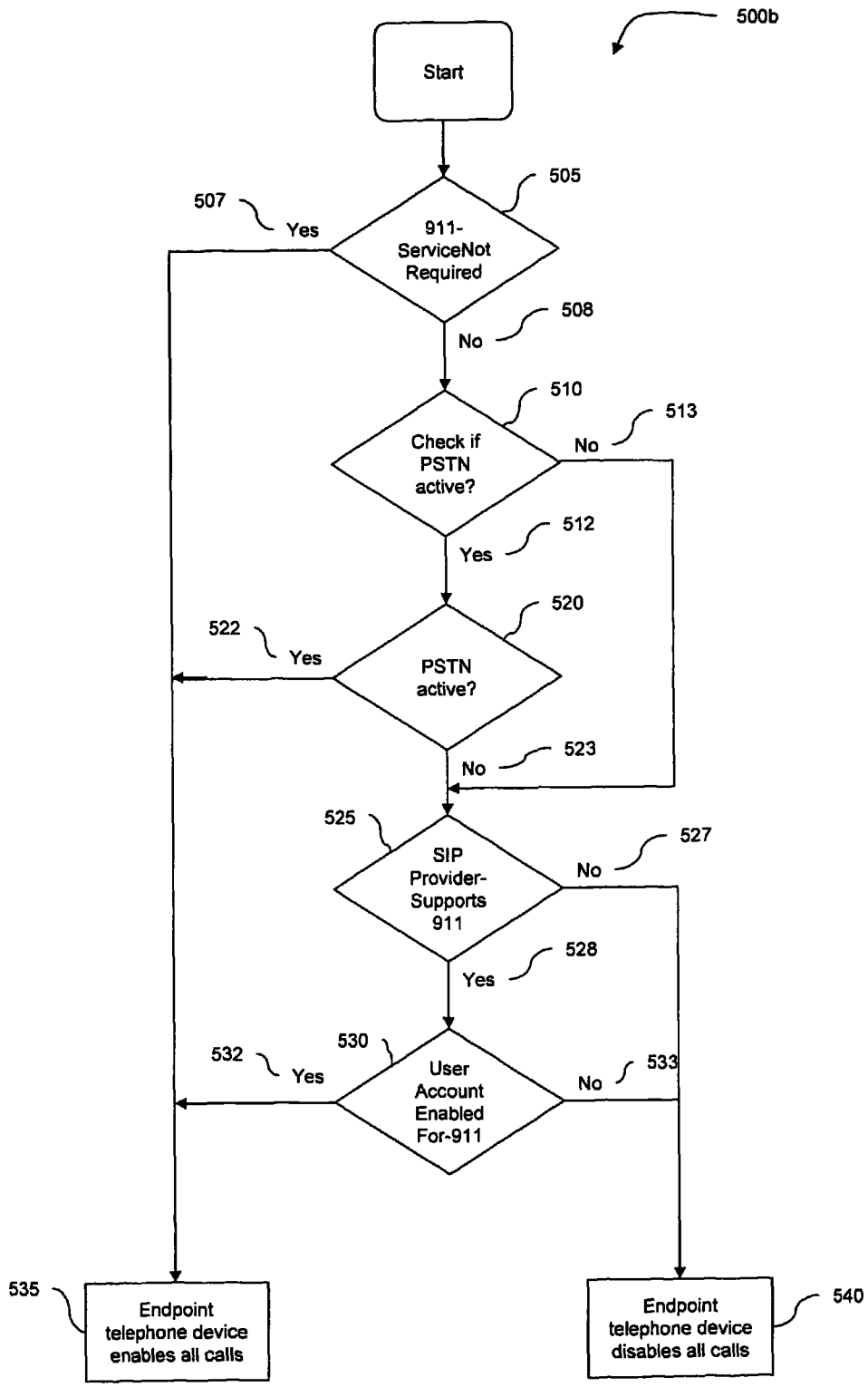

FIG. 5B is a flow diagram illustrating an example embodiment of the algorithm performed in determining whether an endpoint telephone device should enable calling over the packet network or PSTN. This example embodiment is identical to the example embodiment illustrated by FIG. 5A except that the endpoint telephone device contains a switch, as illustrated in FIGS. 2C and 2D. Thus, in an example embodiment, the endpoint telephone device must first determine 510, via the position of the switch, if it should or should not check whether the PSTN connection is active 520. If the VoIP service user has indicated, via the switch, that the endpoint telephone device should check if the PSTN connection is active 512, the endpoint telephone device then does so 520. However, if the VoIP service user has indicated that the endpoint telephone device should not check if the PSTN connection is active 513, then the endpoint telephone device may skip directly to checking whether the VoIP service provider supports emergency service 525.

Figure 5C:
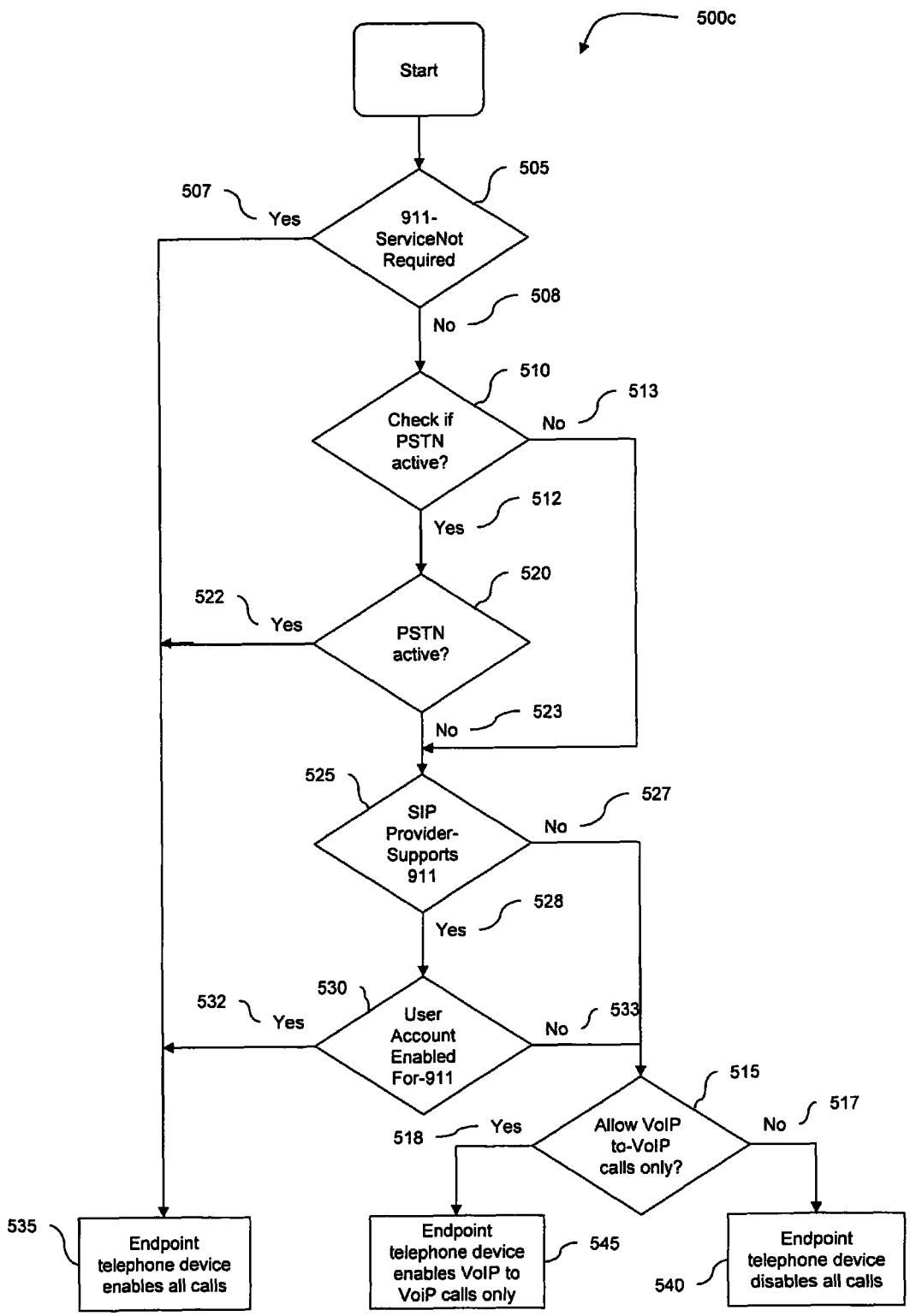

FIG. 5C is a flow diagram illustrating an example embodiment identical to the example embodiment illustrated by FIG. 5B, except that the endpoint telephone device must check whether the VoIP service provider allows VoIP-to-VoIP only calls to be made on the VoIP network. If there is no approved method for emergency service access via either the PSTN or the VoIP service provider, and such a method is required by the FCC Order, the endpoint telephone device may be enabled for VoIP-to-VoIP calling if the VoIP service provider supports this feature. In this case, the VoIP service provider would allow calls from the endpoint telephone device to be made only over the packet network and not over the PSTN.

Thus, in an example embodiment, before enabling VoIP-to-VoIP calls only, the endpoint telephone device must check the value of the data field Allow-VoIPToVoIPCalls 515 in Eservice-profile. If the value of data field Allow-VoIPToVoIPCalls 515 is NO 517, indicating that the VoIP service provider does not support VoIP-to-VoIP only calls, then the endpoint telephone device disables all calls 540. Otherwise, if the value of data field Allow-VoIPToVoIPCalls 515 is YES 518, indicating that VoIP-to-VoIP only calls are permitted by the VoIP service provider and the VoIP service provider will not allow calls from the endpoint telephone device to be made over the PSTN, then the endpoint telephone device enables VoIP-to-VoIP calls only 545. The endpoint telephone device can issue a special dial tone that indicates only VoIP-to-VoIP calls are supported.

Checking the PSTN Connection

Figure 6:
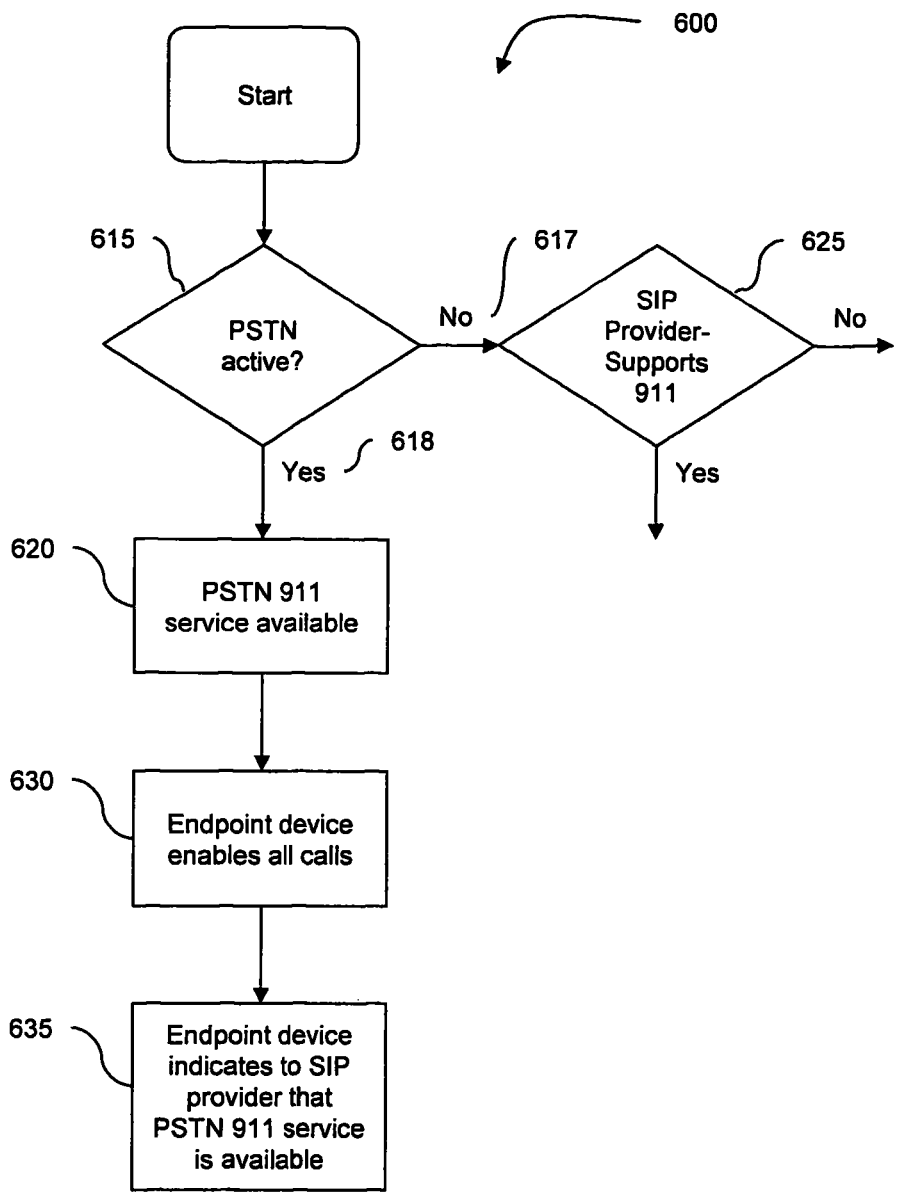
FIG. 6 is a flow diagram illustrating the algorithm performed in determining whether there is an active telephone line attached to the telephone line interface of the endpoint telephone device and, therefore, whether the telephone line interface supports emergency service.

FIG. 6 is a flow diagram 600 illustrating an example embodiment of the algorithm performed in determining whether there is an active telephone line attached to the telephone line interface of the endpoint telephone device and, therefore, whether the telephone line interface supports emergency service. The endpoint telephone device checks for the presence of an active PSTN line 615. This check may involve, for example, testing for dial tone or other AC signals on the PSTN line, testing for PSTN loop current, testing the PSTN DC voltage level, or placing a call to a predetermined number and verifying ringback, a busy signal, or a successful connection. If the endpoint telephone device determines that there is not an active PSTN line connected to the telephone line interface 617, the endpoint telephone device then checks whether the VoIP service provider complies with the FCC Order and supports emergency service 625, corresponding to the same stage of the algorithm 525 as illustrated in FIGS. 5A-5C. If there is an active PSTN line connected to the telephone line interface 618, then PSTN emergency service is available 620. The determination of an active PSTN connection is taken to imply the availability of emergency service on the PSTN line because such emergency service is mandatory on active PSTN lines within the United States.

If the endpoint telephone device detects an active PSTN connection 618, it enables all calls 630 regardless of the value of data field SIPProvider-Supports911 625 in Eservice-profile. When it does this it sends an indication to the VoIP service provider indicating that PSTN emergency service is supported on the PSTN line 635. In an example embodiment, the indication is sent in a SUBSCRIBE packet. In the case that a SUBSCRIBE packet is used to send the indication of PSTN emergency service support, the device re-subscribes when it detects a change in the PSTN emergency service status.

Similarly, the VoIP service provider may respond to each SUBSCRIBE packet with a NOTIFY packet that may include bit fields that the endpoint interprets to indicate how to route VoIP calls, as described previously.

Persistence

Once the endpoint telephone device activates VoIP calling, whether because it found a valid value of data field SIPProvider-Supports911 in Eservice-profile or because it detected an active PSTN connection, the endpoint telephone device maintains the VoIP feature in the active state. However, in an example embodiment, this is subject to continuing tests of the availability of emergency service over both the PSTN and packet network. If, at any time, emergency service becomes unavailable, the endpoint telephone device may disable VoIP calling if, for example, this is necessary in order to remain in compliance with the FCC Order. In an example embodiment, the endpoint telephone device notifies the VoIP service provider if VoIP calling becomes disabled.

The subscription to Eservice-profile results in notifications sent to the endpoint telephone device. Notifications may be sent in response to periodic resubscriptions, or if the VoIP service provider needs to report a change in state relative to EServices. If at any time a notification indicates that VoIP emergency service is no longer available for the account active on the endpoint telephone device or, if a number, such as two, successive notifications in response to periodic resubscriptions fail to arrive at the endpoint telephone device when expected, the endpoint telephone device will disable VoIP calling, unless the PSTN connection is active, in order to remain in compliance with the FCC Order.

Similarly, in an example embodiment, if the endpoint telephone device has detected an active PSTN connection, the endpoint telephone device continuously verifies the connection. In another example embodiment, the endpoint telephone device tests for an active PSTN connection when a user puts the telephone set connected to the telephone set interface in an off-hook condition. If at any time the endpoint telephone device determines that the PSTN connection is no longer active, the endpoint telephone device disables VoIP calling unless the value of the SIPProvider-Supports911 data field indicates that the VoIP service provider supports emergency service.

Device States and Emergency Service Routing

FIG. 7 is a table 700 illustrating four states of PSTN and VoIP emergency service availability. The endpoint telephone device configures default emergency service routing according to which state it is in.

In state A, VoIP emergency service is not available and PSTN emergency service is not available. Based on this availability, for a VoIP service provider required under the FCC Order to supply emergency service to the endpoint telephone device, the endpoint telephone device completely disables VoIP operations because the availability of emergency service does not comply with the FCC Order. When the telephone set connected to the endpoint telephone device comes off hook, the endpoint telephone device connects its telephone set interface to the VoIP circuitry and generates a distinctive tone, such as a reorder tone, indicating that calling is not available. If the VoIP service provider sets the value of data field Allow-VoIPToVoIPCalls in Eservice-profile to YES, indicating it will allow calls to be made from the endpoint telephone device over the packet network to another VoIP device and will not interconnect calls from the endpoint telephone device to the PSTN, then the endpoint telephone device may accept incoming and outgoing VoIP-to-VoIP calls only. In this case, the device generates a dial tone when the telephone set connected to the endpoint telephone device comes off hook. The device continuously loops through its initialization detection routine searching for either VoIP or PSTN emergency service. If the endpoint telephone device detects that VoIP emergency service is available, it proceeds to state B. If the endpoint telephone device detects PSTN connectivity, it proceeds to state C. If the endpoint telephone device detects both VoIP emergency service and PSTN connectivity it proceeds to state D.

In state B, VoIP emergency service is available and PSTN emergency service is not available. Based on this availability, for a VoIP service provider required under the FCC Order to supply emergency service to the endpoint telephone device, the endpoint telephone device routes all calls, including emergency service calls, via the VoIP connection. The endpoint telephone device checks for PSTN connectivity on the telephone line interface either periodically or whenever the telephone set connected to the telephone set interface comes off hook. If the endpoint telephone device detects PSTN connectivity, it proceeds to state D. The endpoint telephone device also continuously checks the availability of VoIP emergency service. If VoIP emergency service becomes unavailable, the endpoint telephone device proceeds to state A. If VoIP emergency service becomes unavailable and the endpoint telephone device detects PSTN connectivity, the endpoint telephone device proceeds to state C.

In state C VoIP emergency service is not available and PSTN emergency service is available. Based on this availability, for a VoIP service provider required under the FCC Order to supply emergency service to the endpoint telephone device, the endpoint telephone device routes emergency service calls via the PSTN and may route any or all other calls via VoIP according to information provided by the VoIP service provider. The endpoint telephone device continuously checks the availability of VoIP emergency service. If the endpoint telephone device detects that VoIP emergency service is available, it proceeds to state D. The endpoint telephone device also continuously checks for PSTN connectivity. If the endpoint telephone device detects that the PSTN is no longer connected, the endpoint telephone device proceeds to state A. If the endpoint telephone device detects that the PSTN is no longer connected and VoIP emergency service becomes available, the endpoint telephone device proceeds to state B.

In state D VoIP emergency service is available and PSTN emergency service is available. Based on this availability, for a VoIP service provider required under the FCC Order to supply emergency service to the endpoint telephone device, the endpoint telephone device routes emergency service calls, and any and all other calls, either via the PSTN or via VoIP according to information provided by the VoIP service provider. The endpoint telephone device continuously checks the availability of VoIP emergency service. If the endpoint telephone device detects that VoIP emergency service is not available, the endpoint telephone device proceeds to state C. The endpoint telephone device also continuously checks for PSTN connectivity. If the endpoint telephone device detects that the PSTN is no longer connected, the endpoint telephone device proceeds to state B. If the endpoint telephone device detects that the PSTN is no longer connected and VoIP emergency service becomes unavailable, the endpoint telephone device proceeds to state A.

FIG. 8 is a table 800 illustrating two states of VoIP emergency service availability when the endpoint telephone device is in VoIP only mode or does not include a telephone line interface. The endpoint telephone device enters VoIP only mode when the VoIP service user selects the switch position that indicates to the endpoint telephone device that a telephone line will not be connected to the telephone line interface of the endpoint telephone device. Similarly, if the endpoint telephone device does not include a telephone line interface, it is not possible for a user to connect a telephone line to the endpoint telephone device via its telephone line interface. Therefore, PSTN emergency service over the telephone line interface is not only not available, but is also not possible, making states C and D irrelevant such that the device may only operate in state A or B.

In state A (which is similar to state A in FIG. 7 except that there is no PSTN line connected to the endpoint telephone device, rather than there being a lack of emergency service on a connected telephone line), VoIP emergency service is not available. Based on this availability, for a VoIP service provider required under the FCC Order to supply emergency service to the endpoint telephone device, the endpoint telephone device is disabled for VoIP calling because it does not comply with the FCC Order. In state B (which is similar to state B in FIG. 7 except that there is no PSTN line connected to the endpoint telephone device rather than there being a lack of emergency service on a connected telephone line), VoIP emergency service is available. Based on this availability, for a VoIP service provider required under the FCC Order to supply emergency service to the endpoint telephone device, the endpoint telephone device is enabled for VoIP calling because it complies with the FCC Order.

While this invention has been particularly shown and described with references to preferred embodiments thereof, it will be understood by those skilled in the art that various changes in form and details may be made therein without departing from the scope of the invention encompassed by the appended claims.

What is claimed is:

1. An endpoint telephone device for ensuring accessibility to emergency service via VoIP or via PSTN comprising:
    a packet network interface to be connected to a packet network;
    a telephone line interface to be connected to a PSTN telephone line;
    a telephone set interface to be connected to a telephone set; and
    a controller configured to receive information from a VoIP service provider, the VoIP service provider providing VoIP services to VoIP service users, indicating accessibility of the emergency service on the packet network interface where required, to sense the telephone line interface to verify accessibility to the emergency service over the telephone line interface, and to route calls to the packet network interface or the telephone line interface and restrict VoIP calls dependent on the information and sensed accessibility, emergency service calls being routed to the PSTN telephone line when the emergency service is not available on the packet network interface; and programmable bits that can be set by the VoIP service provider and used to determine the endpoint's behavior, including its decision about whether to route a call to the VoIP service provider; and further the endpoint device is configured to supply the VoIP service provider's server with required information in relation to the status of the endpoint's PSTN connection to enable the VoIP service provider's server to make a routing decision.

2. The endpoint telephone device according to claim 1 wherein the emergency service is 911 service or enhanced 911 service.

3. The endpoint telephone device according to claim 1 wherein the controller notifies the VoIP service provider of the accessibility of the emergency service over the telephone line interface.

4. The endpoint telephone device according to claim 1 wherein the controller restricts calling over the packet network interface when the VoIP service provider is required to supply the emergency service to the endpoint telephone device, the emergency service over the packet network interface is not confirmed, and the emergency service over the telephone line interface is not verified.

5. The endpoint telephone device according to claim 1 wherein the controller routes all calls, including emergency service calls, over the packet network interface when the VoIP service provider is required to supply the emergency service to the endpoint telephone device, the emergency service over the packet network interface is confirmed, and the emergency service over the telephone line interface is not verified.

6. The endpoint telephone device according to claim 1 wherein the controller routes emergency service calls over the telephone line interface when the VoIP service provider is required to supply the emergency service to the endpoint telephone device, the emergency service over the packet network interface is not confirmed, and the emergency service over the telephone line interface is verified.

7. The endpoint telephone device according to claim 1 wherein the controller routes all calls, including emergency service calls, over the packet network interface or over the telephone line interface according to information supplied to the controller by an information server when the VoIP service provider is required to supply the emergency service to the endpoint telephone device, the emergency service over the packet network interface is confirmed, and the emergency service over the telephone line interface is verified.

8. The endpoint telephone device according to claim 1 wherein the controller routes all calls over the packet network interface or over the telephone line interface according to information supplied to the controller by an information server when the VoIP service provider is not required to supply the emergency service to the endpoint telephone device.

9. The endpoint telephone device according to claim 1 wherein the controller restricts calling over the packet network interface only to other VoIP devices when the VoIP service provider is required to supply the emergency service to the endpoint telephone device, the emergency service over the packet network interface is not confirmed, and the emergency service over the telephone line interface is not verified.

10. The endpoint telephone device according to claim 1 wherein the controller contains a software switch to connect the telephone set interface to the packet network interface or, alternatively, to the telephone line interface.

11. The endpoint telephone device according to claim 1 wherein the controller contains a hardware switch or relay to connect the telephone set interface to the packet network interface or, alternatively, to the telephone line interface.

12. The endpoint telephone device according to claim 11 wherein the hardware switch or relay automatically connects the telephone set interface to the telephone line interface when power is disrupted to the endpoint telephone device.

13. The endpoint telephone device according to claim 1 wherein the endpoint telephone device contains a switch indicating whether the endpoint telephone device should check whether the emergency service can be verified over the telephone line interface.

14. The endpoint telephone device according to claim 1 wherein the controller verifies the status of the emergency service over the telephone line interface by sensing whether there is an active telephone line connected to the telephone line interface.

15. The endpoint telephone device according to claim 1 wherein the controller notifies the VoIP service provider whenever it senses a change in whether there is an active telephone line connected to the telephone line interface.

16. The endpoint telephone device according to claim 1 wherein the controller restricts calling over the packet network interface when a number of successive notifications from the VoIP service provider fail to arrive at the endpoint telephone device when expected in response to resubscriptions unless there is an active telephone line connected to the telephone line interface.

17. The endpoint telephone device according to claim 1 wherein the controller routes calls dependent on whether a call is an emergency service call.

18. A method for ensuring accessibility to emergency service via VoIP or via PSTN comprising, at an endpoint telephone device:
   providing a packet network interface to be connected to a packet network;
   providing a telephone line interface to be connected to a PSTN telephone line;
   providing a telephone set interface to be connected to a telephone set;
   receiving information from a VoIP service provider, the VoIP service provider providing VoIP services to VoIP service users, indicating accessibility of the emergency service over the packet network interface where required;
   sensing the telephone line interface to verify accessibility to the emergency service over the telephone line interface; and
   routing calls to the packet network interface or the telephone line interface and restricting VoIP calls dependent on the information and sensed accessibility, emergency service calls being routed to the PSTN telephone line when the emergency service is not available on the packet network interface;
   in response to the VoIP service provider, setting some programmable bits in the end point device to determine the endpoint's behavior, including its decision about whether to route a call to the VoIP service provider; and
   supplying the VoIP service provider's server with required information in relation to the status of the endpoint's PSTN connection to enable the VoIP service provider's server to make a routing decision.

19. The method according to claim 18 wherein the emergency service is 911 service or enhanced 911 service.

20. The method according to claim 18 further comprising notifying the VoIP service provider of the accessibility of the emergency service over the telephone line interface.

21. The method according to claim 18 further comprising restricting calling over the packet network interface when the VoIP service provider is required to supply the emergency service over the packet network interface, the emergency service over the packet network interface is not confirmed, and the emergency service over the telephone line interface is not verified.

22. The method according to claim 18 further comprising routing all calls, including emergency service calls, over the packet network interface when the VoIP service provider is required to supply the emergency service over the packet network interface, the emergency service over the packet network interface is confirmed, and the emergency service over the telephone line interface is not verified.

23. The method according to claim 18 further comprising routing emergency service calls over the telephone line interface when the VoIP service provider is required to supply the emergency service over the packet network interface, the emergency service over the packet network interface is not confirmed, and the emergency service over the telephone line interface is verified.

24. The method according to claim 18 further comprising routing all calls, including emergency service calls, over the packet network interface or over the telephone line interface according to information supplied by an information server when the VoIP service provider is required to supply the emergency service over the packet network interface, the emergency service over the packet network interface is confirmed, and the emergency service over the telephone line interface is verified.

25. The method according to claim 18 further comprising routing all calls over the packet network interface or over the telephone line interface according to information supplied by an information server when the VoIP service provider is not required to supply the emergency service over the packet network interface.

26. The method according to claim 18 further comprising restricting calling over the packet network interface only to other VoIP devices when the VoIP service provider is required to supply the emergency service over the packet network interface, the emergency service over the packet network interface is not confirmed, and the emergency service over the telephone line interface is not verified.

27. The method according to claim 18 further comprising verifying the status of the emergency service over the telephone line interface by sensing whether there is an active telephone line connected to the telephone line interface.

28. The method according to claim 18 further comprising notifying the VoIP service provider whenever a change is sensed in whether there is an active telephone line connected to the telephone line interface.

29. The method according to claim 18 further comprising restricting calling over the packet network interface when a number of successive notifications from the VoIP service provider fail to arrive over the packet network interface when expected in response to resubscriptions, unless there is an active telephone line connected to the telephone line interface.

30. The method according to claim 18 further comprising routing calls dependent on whether a call is an emergency service call.

31. A method for ensuring accessibility to emergency service via VoIP or via PSTN comprising, at an endpoint telephone device of a VoIP service user:
   registering the endpoint telephone device of the VoIP service user with a VoIP service provider, the VoIP service provider providing VoIP services to the VoIP service user;
   sensing whether the emergency service is available over a PSTN telephone line interface and notifying the VoIP service provider of the sensed availability;
   receiving at the endpoint telephone device notification whether the VoIP service provider is required to supply the emergency service to the endpoint telephone device;

receiving at the endpoint telephone device notification whether an account of the VoIP service user is configured for VoIP emergency service;

receiving at the endpoint telephone device notification whether the VoIP service provider supplies the emergency service to the endpoint telephone device; and routing calls over a packet network interface or over the telephone line interface and restricting calls over the packet network interface dependent on information conveyed by the sensing and notifying, emergency service calls being routed to the PSTN telephone line when emergency service is not available on the packet network interface;

in response to the VoIP service provider, setting programmable bits in the endpoint device to determine the endpoint's behavior, including its decision about whether to route a call to the VoIP service provider; and supplying the VoIP service provider's server with required information in relation to the status of the endpoint's PSTN connection to enable the VoIP service provider's server to make a routing decision.

32. The method according to claim 31 further comprising restricting calling over the packet network interface when a number of successive notifications from the VoIP service provider fail to arrive at the endpoint telephone device when expected in response to resubscriptions, unless there is an active telephone line connected to the telephone line interface.

33. The method according to claim 31 further comprising periodically receiving notification at the endpoint telephone device:
whether the VoIP service provider is required to supply the emergency service to the endpoint telephone device;
whether the VoIP service user's account is configured for VoIP emergency service; and
whether the VoIP service provider provides the emergency service to the endpoint telephone device.

34. The method according to claim 31 further comprising immediately receiving notification at the endpoint telephone device whenever there is a change in
whether the VoIP service provider is required to supply the emergency service to the endpoint telephone device;
whether the VoIP service user's account is configured for VoIP emergency service; or
whether the VoIP service provider provides the emergency service to the endpoint telephone device.

35. An endpoint telephone device for ensuring emergency service via VoIP or via PSTN comprising:
a packet network interface to be connected to a packet network;
a telephone line interface to be connected to a PSTN telephone line;
a telephone set interface to be connected to a telephone set;
means for receiving information from a VoIP service provider, the VoIP service provider providing VoIP services to VoIP service users, indicating accessibility of the emergency service over the packet network interface where required;
means for sensing the telephone line interface to verify accessibility to the emergency service over the telephone line interface; and
means for routing calls to the packet network interface or the telephone line interface and restricting VoIP calls dependent on the information and sensed accessibility, emergency service calls being routed to the PSTN telephone line when the emergency service is not available on the packet network interface;
programmable bits that can be set by the VoIP service provider and used to determine the endpoint's behavior, including its decision about whether to route a call to the VoIP service provider; and
means for supplying the VoIP service provider's server with required information in relation to the status of the endpoint's PSTN connection to enable the VoIP service provider's server to make a routing decision.

36. A method for ensuring accessibility to emergency service via VoIP or via PSTN comprising, at a VoIP service provider:
configuring an account of a VoIP service user of the VoIP service provider for the emergency service, the VoIP service provider providing VoIP services to the VoIP service user;
registering an endpoint telephone device of the VoIP service user with the VoIP service provider;
receiving notification whether the emergency service is available over a PSTN telephone line interface at the endpoint telephone device;
notifying the endpoint telephone device whether the VoIP service provider is required to supply the emergency service to the endpoint telephone device;
notifying the endpoint telephone device whether the VoIP service user's account is configured for VoIP emergency service; and
notifying the endpoint telephone device whether the VoIP service provider supplies the emergency service to the endpoint telephone device to enable calls to be routed over a packet network interface or over the telephone line interface of the endpoint telephone device dependent on information conveyed by the notifying, emergency service calls being routed to the PSTN telephone line when the emergency service is not available on the packet network interface; and
setting programmable bits in the endpoint device to determine the endpoint's behavior, including its decision about whether to route a call to the VoIP service provider; and
making a routing decision at the VoIP service provider's server, as long as the endpoint supplies the server with required information in relation to the status of the endpoint's PSTN connection.

37. The method according to claim 36 further comprising periodically notifying the endpoint telephone device:
whether the VoIP service provider is required to supply the emergency service to the endpoint telephone device;
whether the VoIP service user's account is configured for VoIP emergency service; and
whether the VoIP service provider provides the emergency service to the endpoint telephone device.

38. The method according to claim 36 further comprising immediately notifying the endpoint telephone device whenever there is a change in
whether the VoIP service provider is required to supply the emergency service to the endpoint telephone device;
whether the VoIP service user's account is configured for VoIP emergency service; or
whether the VoIP service provider provides the emergency service to the endpoint telephone device.

* * * * *